UNITED STATES PATENT OFFICE.

HARRY SEYMOUR, OF DARTMOOR, GREAT BRITAIN.

IMPROVED ARTIFICIAL FUEL.

Specification forming part of Letters Patent No. 36,305, dated August 26, 1862.

*To all whom it may concern:*

Be it known that I, HARRY SEYMOUR, of Dartmoor, in the county of Devonshire and Kingdom of Great Britain, have invented a new and useful composition of matter intended to be employed as an artificial fuel, which I denominate "Seymour's Concentrated Fuel;" and I do hereby declare that the following is a full, clear, and exact description of the same.

My improved composition is made of the following ingredients and proportions: silex and alumina, seventy-five parts, by weight; well-dried refuse vegetable matter, three hundred and seventy-five parts, by weight; petroleum or coal-oil, four hundred and seventy-five parts, by weight. The vegetable matter is boiled in the petroleum for twenty-four hours, or until such time as the petroleum is absorbed. It is then removed and well mixed with the silex and alumina, and the mixture is then molded into bricks and dried, when it is ready for use.

Instead of silex and alumina, other mineral substances can be substituted, and the proportion of the several substances must then be changed. A good fuel is obtained, for instance, by mixing the following substances: lime, two hundred parts, by weight; oxygenated manganese or fibrous oxygenated earths, three hundred parts, by weight; petroleum, two hundred and fifty parts, by weight; refuse animal matter, fifty parts, by weight. In this case the fibrous earth is mixed with the lime, and thoroughly dried, and the animal matter is boiled in the petroleum until the latter is absorbed. All the ingredients are now thoroughly mixed and molded into bricks and dried, and, when dried, the bricks are placed in a vat and allowed to absorb as much petroleum as they will receive and allowed to drain until required for use.

The fuel may also be prepared in the following manner: Take silex and alumnia, two hundred and fifty parts; peat, earth, sawdust, tanner's bark, green roots, separately or mixed together, five hundred parts, and carefully mix them through any mixing-machine and cast them into bricks. These bricks are carefully dried, and they are now dipped into the petroleum and drained and afterward dried in an oven or kiln, when they are ready for use.

It is obvious that the petroleum can be used either in its natural or in a refined state, and instead of petroleum, coal-oil or allied manufactured substances might be substituted.

Having thus fully described my invention, what I claim as new, and desire to secure by Letters Patent, is—

The composition for an artificial fuel made of the ingredients and in the manner and proportions herein set forth.

HARRY SEYMOUR.

Witnesses:
 R. STUART,
 WM. MCPHERSON.